Jan. 29, 1963 W. FROEDE ET AL 3,075,505
PORT CONSTRUCTION FOR ROTARY COMBUSTION ENGINE
Filed April 13, 1960 4 Sheets-Sheet 1
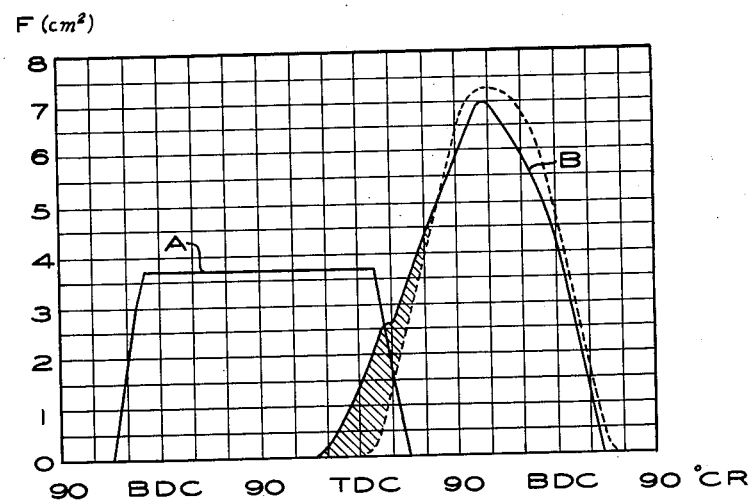
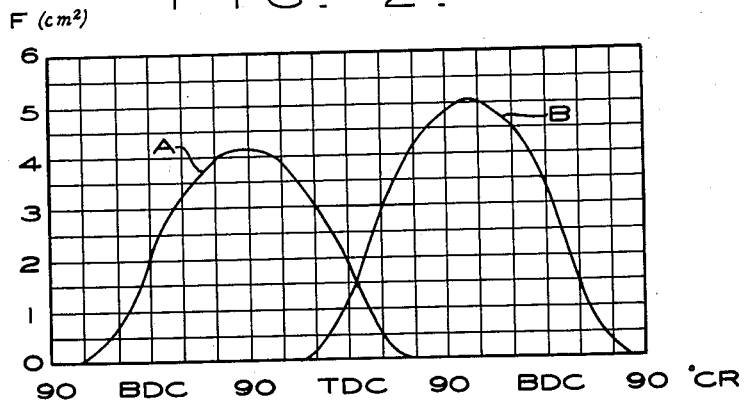
INVENTORS
WALTER FROEDE
ERNST HÖPPNER
BY
ATTORNEYS

INVENTOR.
WALTER FROEDE
ERNST HÖPPNER

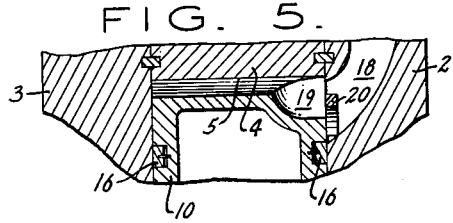
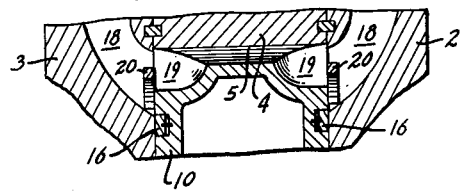
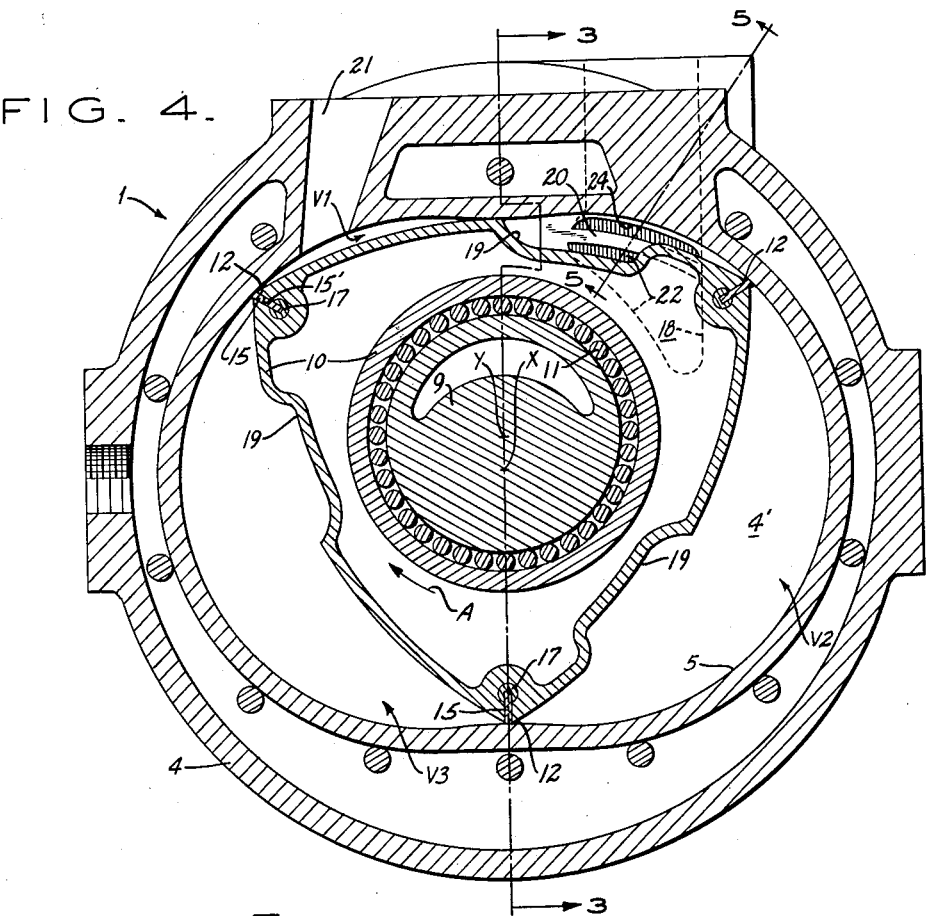
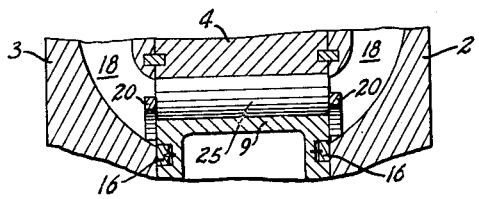

INVENTOR.
WALTER FROEDE
ERNST HÖPPNER
BY
ATTORNEYS

United States Patent Office 3,075,505
Patented Jan. 29, 1963

3,075,505
PORT CONSTRUCTION FOR ROTARY
COMBUSTION ENGINE
Walter Froede, Neckarsulm, and Ernst Höppner, Furfeld, near Heilbronn, Germany, assignors to NSU Motorenwerke Aktiengesellschaft, Neckarsulm, and Wankel G.m.b.H., Lindau (Bodensee), Germany
Filed Apr. 13, 1960, Ser. No. 21,945
Claims priority, application Germany Apr. 23, 1959
10 Claims. (Cl. 123—8)

This invention relates to rotary internal combustion engines which operate on a working cycle which includes the four phases of intake, compression, expansion and exhaust, and relates more particularly to intake port systems of such engines.

This invention is of utility especially with rotary internal combustion engines of the type which operates on the above-mentioned working cycle and comprises a pair of bodies mounted, one within the other, for relative rotation on parallel axes, and having respective facing surfaces which define working chambers varying in volume with such rotation in a manner to carry out such working cycle. These facing surfaces comprise inner and outer surface portions of the outer and inner bodies, respectively.

In general, the outer of the pair of bodies may be rotary, but is preferably stationary, and comprises axially-spaced end walls and a peripheral wall interconnecting the end walls and forming therewith an axi-symmetric cavity within which the inner of the bodies, hereinafter termed the rotor, is supported for rotation on an axis, hereinafter termed the rotor axis, which is parallel to and hence eccentric of the axis of symmetry of the cavity and is constrained to follow a circular path of fixed radius prescribed about this axis of symmetry. For convenience of reference, the outer body is sometimes hereinafter termed the rotor housing, and the axis of symmetry of the cavity is sometimes hereinafter termed the outer body axis, or rotor housing axis. Particular facing surfaces of the rotor and the outer body are the peripheral outer surface of the rotor and the inner surface of the peripheral wall of the outer body.

The peripheral outer surface of the rotor includes a number of circumferentially spaced apex portions symmetrically arranged with respect to the rotor axis and having sealing edges parallel to the outer body axis. These edges are at all times in sliding sealing engagement with the inner surface of the peripheral wall of the outer body.

The inner surface of the peripheral wall of the outer body includes circumferentially spaced arched lobe-defining portions successively joined together and symmetrically arranged with respect to the outer body axis, these lobe-defining portions being one less in number than the number of apex portions, and providing, at their junctions with each other, points of minimum distance from the outer body axis, which points are circumferentially spaced and symmetrically arranged with respect to the outer body axis. Advantageously, the profile of the inner surface of the peripheral wall of the outer body in planes normal to the outer body axis may be that of a two-lobed epitrochoid and the profile of the outer peripheral surface of the rotor in the same planes be that of the so-called three-lobed inner envelope of the two-lobed epitrochoid, although deviations in the contour of the outer peripheral surface of the rotor, in the form of recesses or depressions provided in this surface between adjacent apex portions may be made as required to obtain preferred combustion chamber shapes and volumes, and compression ratios.

The outer body further comprises intake ports in one or both of its end walls which ports are covered and uncovered by the end faces of the rotor as it rotates, or by end seal means arranged at the end faces of the rotor, the earliness of lateness of the port opening or closing and the effective area of the ports being controlled by the peripheral edges of the rotor or of the end seal means, wiping across the port. In known forms of rotors, these peripheral edges do not commence to uncover the port before the rotor has reached a top dead-center position, that is, a position in which one or another of the above-mentioned minimum distance junction points lies in a plane common to the rotor axis and the outer body axis. Hence, relative to valve-controlled reciprocating engines, this peripheral edge type of control results in a late intake, thus reducing the rate of feeding considerably.

It is accordingly among the objects of this invention to enable an initial opening of an intake port in an end wall of such a rotary internal combustion engine, to be effected substantially before the engine rotor reaches an upper dead-center position in an exhaust phase of the engine working cycle.

It is another object of this invention to enable such earlier initial opening of an intake port to be obtained and be supplemented by an increase in the gross effective intake port area over substantially the greater portion of the port-opening stage of the intake phase, to the end that the rate of feeding of combustible fuel-air mixture into a given working chamber, may be increased, and the breathing of the engine improved.

Another object of this invention is to accomplish the foregoing objects without lessening or loss of sealing between the inner surface of the outer body end walls and the rotor end faces, and between the rotor apex portions and the inner surface of the outer body peripheral wall.

Other and further objects of this invention will appear from the following description, the accompanying drawings, and the appended claims.

In general, the objects of this invention are accomplished in connection with an engine having an intake port in either end wall, by relieving or, in other words, depressing, the peripheral edge of the rotor, which controls the opening and closing of the intake port, between each two adjacent apex edges, within that part of the peripheral edge, which leads with respect to the direction of movement of the rotor relative to the outer body or rotor housing. By thus relieving the peripheral edge, recesses or depressions are formed in the rotor, which recesses extend for a suitable distance from the end face of the rotor opposite the ported end wall toward the other end face and serve to uncover the intake port in the exhaust phase of the working cycle for a given working chamber, substantially before the rotor reaches a top dead-center position in the exhaust phase of the working cycle. The recesses may be continued in axial direction toward the opposite end face, if desired, to an extent such that they may form part of combustion chambers provided in the peripheral outer surface of the rotor. For ease in manufacture, the recesses may be extended over the whole axial width of the rotor, if desired, and the same applies if both end walls of the housing are provided with intake ports. It will be understood, however, that if both end walls of the housing are provided with intake ports, the recesses extending inwardly from the respective end faces may, as an alternative, terminate short of each other at their adjacent ends so as to leave the outer peripheral surface of the rotor uninterrupted therebetween.

In accordance with a presently preferred embodiment of this invention, the rotor is provided at its axis-parallel apex edges with radially-movable, axis-parallel sealing strips which are maintained continuously in sliding sealing engagement with the inner surface of the peripheral wall of the rotor housing. The rotor is also provided at each of its end faces with axially movable end seal means which are connected to the radially movable sealing strips by axially extending, axially movable connecting pieces which slidably sealingly engage the end walls of the housing. Axially-extending grooves are provided in the apex portions of the rotor over the full axial width thereof, for the reception of the radially movable sealing strips. The aforementioned recesses or depressions form discontinuities in the peripheral edges of the rotor. In order that continuity of the peripheral edges of the end seal means may be obtained despite the discontinuity of the peripheral edges of the rotor, which continuity is desirable for ease in manufacture—the axially-movable connecting pieces which connect the axis-parallel sealing strips with the end seal means are required to be located in the apex portions of the rotor at a relatively large distance from the respective apex edges, measured in a direction radially inwardly from the apex edges towards the center of the rotor. On the other hand, for good breathing of the engine, the intake port provided in at least one end wall of the housing should be of as large an area as possible. The magnitude of this area, for an end wall intake port having a given inner margin or edge, will depend in part on the distance of the outer margin or edge of the port from the inner surface of the rotor housing peripheral wall. It follows that the lesser this distance, the greater the area of the intake port will be. It follows also that if this distance be the same or less than the distance of the axially-movable connecting pieces from the apex edges of the rotor, the curved track or path described by the connecting pieces on rotation of the rotor will cross over the intake port provided in at least one end wall of the housing with the risk that these connecting pieces which otherwise would slide on the end walls of the housing will fall or otherwise move into the intake port. This would result in an immediate loss of sealing. In accordance with this invention and in order to avoid this drawback, the outer margin of the intake port is located, preferably, in as close proximity to the inner surface of the peripheral wall as is feasible, and the intake port is divided by a web which lies between the outer and inner margins of the intake port and on the curved track or path described by the connecting pieces on rotation of the rotor. As the end seal means are relatively far away from the peripheral edges of the rotor in the apex portions of the rotor and on both sides of the rotor, they may be embedded in the end faces of the rotor. This results in a more favorable sectional shape of the working chambers when they have minimum volume than would be obtained if the usual end seal means which are placed on the end faces of the rotor would be used.

In the accompanying drawings which form part of the instant specification and are to be read in conjunction therewith and in which like numbers refer to like parts throughout the several views, FIG. 1 is an area-crank angle diagram showing by the broken line curve typical opening and closing pattern for the intake port system of a known type of rotary internal combustion engine, the diagram also showing by the solid line curve A a typical opening and closing pattern for the exhaust port for the same engine, and by the solid line curve B a typical opening and closing pattern for the intake port of a rotary internal combustion engine embodying this invention;

FIG. 2 is an area-crank angle diagram showing by the curve A a typical opening and closing pattern for the exhaust port of a reciprocating engine, and by the curve B a typical opening and closing pattern for the intake port of the same engine;

FIG. 4 is a view in section taken on the line 4—4 of FIG. 3;

FIG. 5 is a fragmentary view in section and on a somewhat larger scale than the scale of FIG. 4, showing details of the relieved rotor-intake port system of the engine of FIGS. 3 and 4, the view being taken along the line 5—5 of FIG. 4;

FIG. 6 is a fragmentary view in section similar to the view of FIG. 5 and showing a modification of the relieved rotor-intake port system of this invention;

Figure 3:
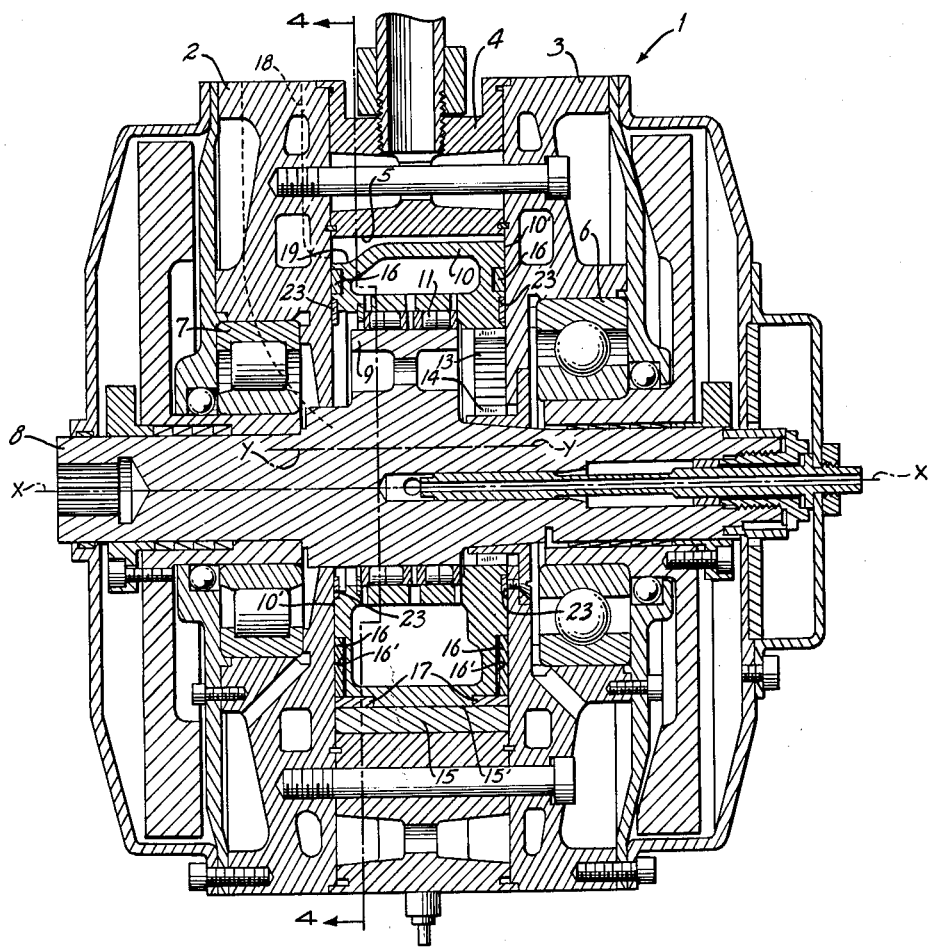
FIG. 3 is a view in longitudinal section of a rotary internal combustion engine embodying the relieved rotor-intake port system of this invention, the view being taken along the line 3—3 of FIG. 4.

FIG. 7 is a fragmentary view in section also similar to FIG. 5 and showing another modification of the relieved rotor-intake port system of this invention; and FIGS. 8–15 are fragmentary and partially diagrammatic views of a detail of FIGS. 3–5, illustrating the rotor-intake port relationship of the engine of FIGS. 3–5, in different phase positions of the rotor, the views also showing by dash-dot lines and for purposes of comparison an outline of an intake port for the same engine in the case where the connecting pieces or sealing pins are not displaced radially inwardly as is the case by this invention.

Referring now more particularly to FIG. 1, the solid curve B depicts the opening and closing pattern of the intake port of a rotary internal combustion engine embodying the relieved rotor-intake port system of this invention. The solid curve A depicts the opening and closing pattern of the exhaust port for the same engine, the curves being in the form of the usual area-crank angle diagrams. The broken line curve depicts the opening and closing pattern of the intake port with rotor internal combustion engines in which the contour of the outer peripheral surface of the rotor is approximated to the so-called "inner envelope" of the inner peripheral surface of the rotor housing. It will be apparent from a consideration of the broken line curve that with such engines the intake port does not open before the rotor has reached its upper dead-center position in the exhaust phase of the working cycle for a given working chamber. It will be apparent also from a consideration of the solid line curve B in FIG. 1, that in rotary internal combustion engines according to this invention, the intake port may open at a position as much as 40° crank angle before the upper dead-center position of the rotor in the exhaust phase of the working cycle for a given working chamber. It will be apparent also from a consideration of FIG. 1, that, as shown by the hatched area of FIG. 1, there is a substantial gain of effective intake cross-sectional area at the beginning of the intake phase and over a substantial portion of the intake opening phase.

Referring now more particularly to FIG. 2 it will be apparent from a comparison of the curve B of the opening and closing pattern of an intake port of a typical reciprocating engine with the curve B of FIG. 1, that the control of the intake port with a rotary internal combustion engine according to this invention, corresponds, at least with respect to the beginning of the intake phase and over a substantial portion of the opening phase, to a large extent with that for the reciprocating engine.

Referring now more particularly to FIGS. 3 and 4, there is depicted a rotary internal combustion engine in accordance with this invention and comprising a stationary outer body or rotor housing 1. The housing consists in the main of the axially spaced end walls 2 and 3 and of the peripheral wall 4 interconnecting the end walls to form therewith an axi-symmetric cavity 4'. The cavity 4' which is best shown in FIG. 4, is symmetrical with respect to a housing or outer body axis X—X which, in turn, corresponds to the longitudinal axis of a drive shaft 8.

The inner peripheral surface 5 of the peripheral wall 4 is, as here preferably embodied, in the shape of a two-lobed epitrochoid as can be seen from FIG. 4. A shaft 8 is journalled within the housing 1 concentric with the housing axis X—X, by means of suitable anti-friction bearings 6 and 7. The shaft 8 is provided with an eccentric 9 on which a rotor 10 is journalled for rotation on its axis Y—Y, by means of a suitable anti-friction bearing 11. The rotor 10 as here preferably embodied, has the shape of an arched triangle whose profile, as viewed in FIG. 4 corresponds in its broad general outline to the three-lobed so-called "inner envelope" of the two-lobed epitrochoidal inner peripheral surface 5 of the peripheral wall 4.

The rotor 10 is in continuous sliding contact at its axis-parallel apex edges 12 with the inner surface 5 of peripheral wall 4, whereby three variable volume working chambers $V_1$, $V_2$ and $V_3$, are formed. A suitable speed ratio between the drive shaft 8 and the rotor 10 is enforced by suitable gearing which, as here preferably embodied, consists of an internally toothed planet gear 13 concentric with the rotor axis Y—Y and fixed to the rotor, and an externally toothed sun gear 14 concentric with the drive shaft axis X—X and fixed to the housing end wall 3. The gear ratio between planet gear 13 and sun gear 15 is in this embodiment 3:2 which results in a speed ratio of 3:1 between shaft 8 and rotor 10.

The rotor 10 is provided with a sealing system for sealing the working chambers $V_1$, $V_2$ and $V_3$ from each other. This sealing system as here preferably embodied, comprises radially movable sealing strips 15 inserted in axially extending grooves 15' in the apex edges 12 of the rotor, axially movable end seal means 16, and likewise axially movable connecting pieces or sealing pins 17.

The end seal means 16 are made in the form of triangularly shaped sealing plates which have a continuous peripheral edge at the apex zones of the rotor and which are preferably imbedded in grooves 16' in the end faces 10' of the rotor. This has the advantage that the gap which would arise between rotor and adjacent end wall of the housing in the apex zones of the rotor on using a sealing plate which has a continuous peripheral edge and is placed on the end face of the rotor, is closed by the rotor and a favorable cross-sectional shape of the working chamber, is obtained.

An intake port 18 is provided within the end wall 2 of housing 1 which port is controlled by the peripheral edges of rotor 10. These peripheral edges are relieved or depressed between each two adjacent apex edges 12 within that part which leads with respect to the direction of movement of the rotor 10 relative to the housing 1. This direction is shown by the arrow A, FIG. 4. This relieving or depressing of the peripheral edges, results in the formation of peripheral recesses 19 extending inwardly from the end faces 10 of the rotor for a suitable distance in an axial direction, these recesses effecting an earlier opening of the intake port 18 as can be clearly seen from FIG. 4. The inlet port 18 is subdivided by the web 20 lying in the plane of the inner surface of the end wall 3, for a purpose which will be described more full hereinafter with reference to FIGS. 8–15. The inner margin 22 of the inlet port 18 is fixed by the path prescribed by the oil seal rings 23 of the rotor as it turns. Acordingly, for a given location of the inner margin 22 of the inlet port, it will be apparent that the obtainment of a maximum area of the inlet port will depend, in part at least, upon positioning the outer margin 24 of the port as close to the inner peripheral surface 5 of the peripheral wall 4, as is practically feasible. For the purpose of venting combustion products from the respective working chambers $V_1$, $V_2$ and $V_3$, the peripheral wall 4 is provided with a suitably located exhaust passage 21 leading from the cavity 4' to the atmosphere.

In the embodiment of the engine depicted in FIGS. 3 and 4, the intake port 18 is provided in only the end wall 2 of the housing. Accordingly, the peripheral edges on only one side of the rotor 10 are relieved, as can be seen from FIG. 5. In the embodiment depicted in FIG. 6, inlet ports 18 are provided in both end walls 2 and 3 and the peripheral edges of the rotor are relieved on both sides of the rotor to form peripheral recesses 19 on both sides of the rotor. In the embodiment depicted in FIG. 7, inlet ports are provided in both end walls 2 and 3, the peripheral edges of the rotor are relieved on both sides of the rotor to form peripheral recesses on both sides of the rotor, which recesses are extended over the whole axis length of the peripheral outer surface, of the rotor, to provide individual full width recesses 25 which form a part of a combustion chamber provided in the outer peripheral surface of rotor between each two adjacent apex portions of the rotor.

Referring now more particularly to FIGS. 8–15, the progressive opening of the intake port 18 on rotation of the rotor 10 and functioning of the web 20 subdividing the intake port, is clearly depicted. It is desirable to obtain a continuous peripheral edge of the triangular end seal plate 16 and to this end it is necessary that in the apex zones of the rotor, the peripheral edges of the plate 16 be at a relatively large distance radially inwardly from the apex edges of the rotor towards the center of the rotor. For this reason also, the connecting pieces 17 which sealingly connect the end seal plate 16 with the axis-parallel apex sealing strips 15, must likewise be displaced radially inwardly for a relatively large distance. The connecting pieces 17 slide on the respective inner surfaces of the end walls 2 and 3 in the track or path described by them on rotation of the rotor 10. This path traverses the area of the intake port between he inner and outer margins 22 and 24, respectively, of the port so that in the absence of the web 20 there would be likelihood of the connecting pieces falling or otherwise moving into the intake port with resultant immediate loss of sealing. This is avoided in accordance with the present invention by the provision of the web 20 subdividing the inlet port along the plate described by the connecting pieces 17 as the rotor turns. As a result, the connecting pieces always have a firm support in their axial direction and are maintained in continuous sliding engagement with the end walls 2 and 3.

Figure 8:
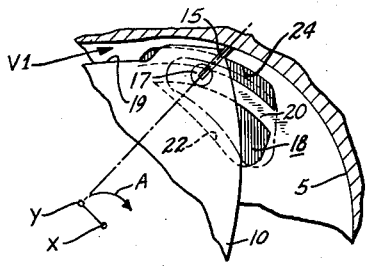
Figure 9:
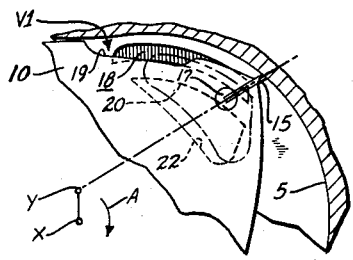

Referring now more particularly to FIGS. 8–15, FIG. 8 depicts a phase position of rotor 10 which position, as respects the intake phase of chamber $V_1$, corresponds to a crank angle of 45° to the horizontal before top dead-center, with the rotor requiring a further 15° of movement in a clockwise direction as viewed in FIGS. 8–15 to reach its top dead-center position shown in FIG. 9. In FIG. 8, the intake port 18 is partially open, having been exposed by reason of the peripheral recess 19 resulting from relieving of the associated peripheral edge of the rotor. In the phase position of the rotor shown in FIG. 9, top dead-center has been reached, the crank angle is now 90° to the horizontal and the rotor has moved 15° clockwise from the 45° angle of the apex edge 12 from the vertical shown in FIG. 8 to the 60° angle of the apex edge shown in FIG. 9. It will be observed from FIGS. 8 and 9 that without the relieving of the peripheral edge of the rotor, the conventional inlet port depicted in dash-dot lines in these two figures would still be completely covered by the rotor and would not begin to be uncovered until the rotor has reached the phase position shown in FIG. 10. The phase positions shown in FIG. 10 and in the following sequential phase position shown in FIGS. 11–15 correspond each to a further 15° movement of the rotor.

Figure 10:
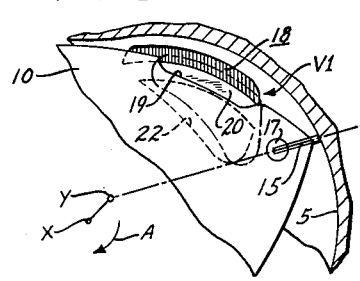
Figure 11:
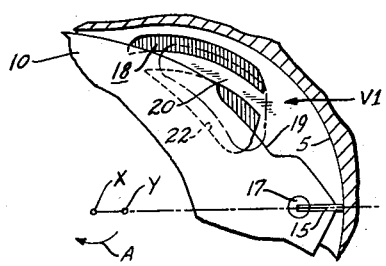
Figure 12:
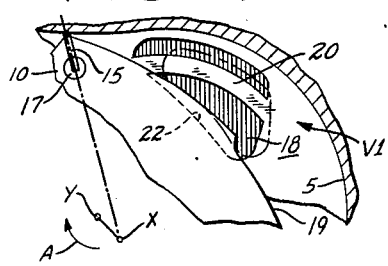
Figure 13:
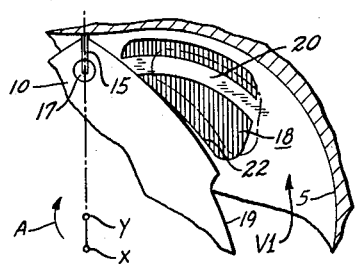
Figure 14:
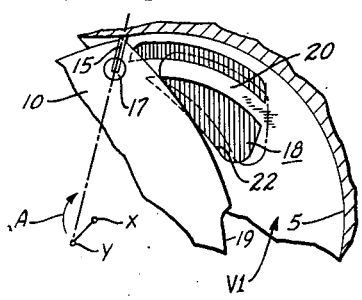
Figure 15:
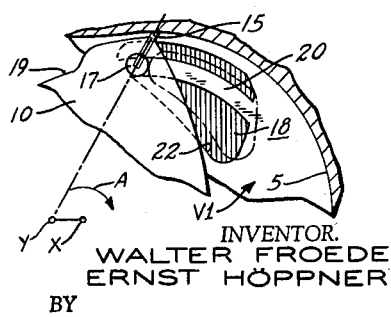

It will be observed that the intake opening is progressively uncovered as the rotor advances from its phase position in FIG. 10 to its phase position in FIG. 13 in which latter position the opening is fully uncovered and the rotor is in its bottom dead-center position with respect to the intake phase. In the phase positions shown in FIGS. 14 and 15, the opening is being covered in the closing portion of the intake phase, this closing continuing through the phase position of FIG. 8 and having been completed in the phase position of FIG. 9. The opening of the intake port 18 shown in FIGS. 8 to 15 corresponds to the course of the intake curve B in the diagram of FIG. 1.

It is obvious that a great many minor variations in the details used in constructing rotary engines of this type may be made without departing from the basic principles of the invention.

While there has been described what is at present considered to be a preferred embodiment of the invention, it is apparent that many changes and modifications may be made therein without departing from the invention, and it is, therefore intended in he accompanying claims to cover all such changes and modifications as fall within the true spirit and scope of the invention.

What is claimed is:

1. A rotating internal combustion engine having a cycle which includes the four phases of intake, compression, expansion and exhaust and comprising a hollow outer body having an axis, axially-spaced end walls, and a peripheral wall intereconnecting the end walls; a rotor mounted within the outer body on an axis eccentric to the axis of the outer body and rotatable relative to the outer body, the rotor having end faces disposed adjacent to the end walls and a plurality of circumferentially-spaced apex portions, said apex portions having apex edges in substantially continuous sliding and sealing engagement with the inner surface of the peripheral wall to form a plurality of working chambers between the rotor and peripheral wall which vary in volume upon relative rotation of the rotor within the outer body, the rotor also having working faces extending between said apex edges, and also having peripheral edges formed by the intersection of the working faces with the end faces; said outer body having at least one intake port in at least one of said end walls, said port being controlled by the peripheral edges of the rotor, said peripheral edges being relieved to form recesses between each two adjacent apex edges in the portion of the peripheral edge which leads with respect to the direction of rotation of the rotor relative to the outer body.

2. The invention as defined in claim 1 in which the recesses formed in the peripheral edges of the rotor extend axially.

3. The invention as defined in claim 2 in which the recesses extend over the entire axial width of the rotor to form working chamber portions in the working faces of the rotor.

4. The invention as defined in claim 1 in which both the outer body and rotor are rotatable.

5. A rotating internal combustion engine having a cycle which includes the four phases of intake, compression, expansion and exhaust and comprising a pair of bodies individually mounted, one within the other, on individual parallel axes for relative rotation and having respective facing surfaces forming working chambers which vary in volume with relative rotation of said bodies, the outer body having axially spaced end walls, a peripheral wall interconnecting said end walls, and at least one opening in at least one of said end walls for the flow of fluid into said chambers, and the inner body having end faces disposed adjacent said end walls, having a number of circumferentially-spaced apex portions sealingly engaging said peripheral wall having working faces which extend between said apex portions and intersect said end faces, and having peripheral edges formed by the intersection of the working faces with the end faces, said peripheral edges connecting adjacent apex portions, at least one of said peripheral edges being relieved within at least that part of said edge which leads with respect to the direction of movement of the inner body relative to the outer body, for controlling the flow of fluid through said opening.

6. A rotating combustion engine comprising a hollow outer body having an axis, axially-spaced end walls, and a peripheral wall interconnecting the end walls; a rotor mounted within the outer body on an axis eccentrtic to the axis of the outer body and rotatable relative to the outer body, the rotor having end faces disposed adjacent to the end walls and a plurality of circumferentially-spaced apex portions, said apex portions having apex edges, radially movable sealing strips in the apex edges of said rotor providing substantially continuous sliding and sealing engagement with the inner surface of the peripheral wall to form a plurality of working chambers between the rotor and said peripheral wall which vary in volume upon relative rotation of the rotor within the outer body, axially movable end seal means at the apex portions of the rotor, and axially movable connecting pieces inteerconnecting said sealing strips and said end seal means and being in sliding engagement with the adjacent end walls of the outer body, the rotor also having working faces extending between said apex edges, and also having peripheral edgese formed by the intersection of the working faces with the end facees; said outer body having at least one intake port in at least one of the said end walls, said intake port being subdivided by a web which lies on a curved track described by said connecting pieces upon rotation of the rotor, said port being controlled by the peripheral edges of the rotor, said peripheral edges being relieved to form recesses between each two adjacent apex edges in the portion of the peripheral edge which leads with respect to the direction of rotation of the rotor relative to the outer body.

7. The invention as defined in claim 6, in which said end seal means are embedded in the end faces of the rotor.

8. A rotating combustion engine comprising a hollow outer body having an axis, axially-spaced end walls, and a peripheral wall interconnecting the end walls, said peripheral wall having an inner surface, the projection of said inner surface on a plane transverse to the axis of the outer body being substantially an epitrochoid having at least two lobes; a rotor mounted within the outer body on an axis eccentric to the axis of the outer body and rotatable relative to the outer body, the rotor having end faces disposed adjacent to the end walls and a plurality of circumferentially-spaced apex portions, said apex portions having apex edges in substantially continuous sliding and sealing engagement witht the inner surface of the peripheral wall to form a plurality of working chambers between the rotor and peripheral wall which vary in volume upon relative rotation of the rotor within the outer body, the rotor also having working faces extending between said apex edges, and also having peripheral edges formed by the intersection of the working faces with the end faces; said outer body having at least one intake port in at least one of said end walls, said port being controlled by the peripheral edges of the rotor, said peripheral edges being relieved to form recesses between each said adjacent apex edges in the portion of the peripheral edge which leads with respect to the direction of rotation of the rotor relative to the outer body.

9. The invention as defined in claim 8, in which the number of said lobes is two and the number of said apex portions is three.

10. A rotating combustion engine comprising a hollow stationary outer body having an axis, axially-spaced end walls, and a peripheral wall interconnecting the end walls; a rotatable shaft journalled in said outer body for rotation on said axis, said shaft having an eccentric portion within said outer body; a rotor rotatably mounted within the outer body and upon said eccentric portion for rotation on an axis eccentric to the axis of the outer body and rotatable relative to the outer body, the rotor having end faces disposed adjacent to the end walls and a plurality of circumferentially-spaced apex portions, said apex portions having apex edges in substantially continuous sliding and sealing engagement with the inner surface of the peripheral wall to form a plurality of working chambers between the rotor and peripheral wall which vary in volume upon relative rotation of the rotor within the outer body, the rotor also having working faces extending between said apex edges, and also having peripheral edges formed by the intersection of the working faces with the end faces; said outer body having at least one intake port in at least one of said end walls, said port being controlled by the peripheral edges of the rotor, said peripheral edges being relieved to form recesses between each two adjacent apex edges in the portion of the peripheral edge which leads with respect to the direction of rotation of the rotor relative to the outer body.

References Cited in the file of this patent

UNITED STATES PATENTS

| | | |
|---|---|---|
| 2,428,181 | Sibley | Sept. 30, 1947 |
| 2,988,065 | Wankel et al. | June 13, 1961 |

FOREIGN PATENTS

| | | |
|---|---|---|
| 853,807 | France | Dec. 16, 1939 |